United States Patent
Stafford

(10) Patent No.: US 8,923,412 B2
(45) Date of Patent: Dec. 30, 2014

(54) WIRELESS ELECTRONIC DEVICE WITH A DECODER AND ASSOCIATED METHODS

(71) Applicant: Research In Motion Limited, Waterloo (CA)

(72) Inventor: Christopher John Stafford, Fordham (GB)

(73) Assignee: BlackBerry Limited, Waterloo (CA)

( * ) Notice: Subject to any disclaimer, the term of this patent is extended or adjusted under 35 U.S.C. 154(b) by 69 days.

(21) Appl. No.: 13/713,788

(22) Filed: Dec. 13, 2012

(65) Prior Publication Data

US 2014/0169506 A1    Jun. 19, 2014

(51) Int. Cl.
   *H04B 1/66*     (2006.01)
   *H04L 1/00*     (2006.01)

(52) U.S. Cl.
   CPC .................................. *H04L 1/0054* (2013.01)
   USPC .......................................................... 375/241

(58) Field of Classification Search
   CPC ................................................... H04B 1/7105
   USPC .......................................................... 375/341
   See application file for complete search history.

(56) References Cited

U.S. PATENT DOCUMENTS

| | | |
|---|---|---|
| 7,142,610 B1 | 11/2006 | Wang |
| 7,586,991 B2 | 9/2009 | Choi |
| 2004/0072594 A1 | 4/2004 | Hwang et al. |
| 2004/0141564 A1 | 7/2004 | Da-Silva-Valente et al. |
| 2007/0165468 A1* | 7/2007 | Nishihara et al. ............. 365/200 |
| 2009/0190682 A1 | 7/2009 | Ouyang et al. |
| 2010/0008201 A1* | 1/2010 | Hashimoto et al. ........ 369/59.22 |
| 2011/0038406 A1 | 2/2011 | Pfletschinger |
| 2011/0150147 A1* | 6/2011 | Yang et al. ..................... 375/341 |
| 2011/0179339 A1* | 7/2011 | Rosenqvist ................... 714/780 |
| 2011/0307767 A1* | 12/2011 | Kelin et al. .................... 714/795 |
| 2013/0343489 A1* | 12/2013 | Maiberger et al. ............ 375/320 |

FOREIGN PATENT DOCUMENTS

| | | |
|---|---|---|
| EP | 0521744 | 1/1993 |
| EP | 1195908 | 4/2002 |
| EP | 1343285 | 9/2003 |

OTHER PUBLICATIONS

Adde et al. "Design of an Eficient Maximum Likelihood Soft Decoder for Systematic Short Blcok Codes" IEEE 2012.
Van Nee et al. "Mazimum Likilihoo Decoding in a Space Division Mulitplexing System" IEEE VTC2000, Tokyo, Japan, May 15-18, 2000.

* cited by examiner

*Primary Examiner* — Santiago Garcia
(74) *Attorney, Agent, or Firm* — Allen, Dyer, Doppelt, Milbrath & Gilchrist, P.A.

(57) ABSTRACT

A method for operating a decoder includes receiving a complex signal representative of a received symbol from among a plurality of symbols. The received symbol includes a plurality of bits and corresponds to a respective point on a constellation map. Likelihood metrics are generated for the received symbol, with each likelihood metric reflecting a likelihood of the received symbol corresponding to one of the points on the constellation map. The likelihood metrics are arranged in columns and rows. Common likelihood metrics are determined for each column and for each row. The common likelihood metrics are compared to determine a best likelihood metric for the bits in the received symbol that are to be compared by columns, and to be compared by rows.

20 Claims, 6 Drawing Sheets

20

|Row\Col|0|1|2|3|4|5|6|7|
|---|---|---|---|---|---|---|---|---|
|0|1|1|1|1|0|0|0|0|
|1|1|1|1|1|0|0|0|0|
|2|1|1|1|1|0|0|0|0|
|3|1|1|1|1|0|0|0|0|
|4|1|1|1|1|0|0|0|0|
|5|1|1|1|1|0|0|0|0|
|6|1|1|1|1|0|0|0|0|
|7|1|1|1|1|0|0|0|0| b(i) encode

|Row\Col|0|1|2|3|4|5|6|7|
|---|---|---|---|---|---|---|---|---|
|0|1|1|0|0|0|0|1|1|
|1|1|1|0|0|0|0|1|1|
|2|1|1|0|0|0|0|1|1|
|3|1|1|0|0|0|0|1|1|
|4|1|1|0|0|0|0|1|1|
|5|1|1|0|0|0|0|1|1|
|6|1|1|0|0|0|0|1|1|
|7|1|1|0|0|0|0|1|1| b(i+2) encode

|Row\Col|0|1|2|3|4|5|6|7|
|---|---|---|---|---|---|---|---|---|
|0|1|0|0|1|1|0|0|1|
|1|1|0|0|1|1|0|0|1|
|2|1|0|0|1|1|0|0|1|
|3|1|0|0|1|1|0|0|1|
|4|1|0|0|1|1|0|0|1|
|5|1|0|0|1|1|0|0|1|
|6|1|0|0|1|1|0|0|1|
|7|1|0|0|1|1|0|0|1| b(i+4) encode

|Row\Col|0|1|2|3|4|5|6|7|
|---|---|---|---|---|---|---|---|---|
|0|0|0|0|0|0|0|0|0|
|1|0|0|0|0|0|0|0|0|
|2|0|0|0|0|0|0|0|0|
|3|0|0|0|0|0|0|0|0|
|4|1|1|1|1|1|1|1|1|
|5|1|1|1|1|1|1|1|1|
|6|1|1|1|1|1|1|1|1|
|7|1|1|1|1|1|1|1|1| b(i+1) encode

|Row\Col|0|1|2|3|4|5|6|7|
|---|---|---|---|---|---|---|---|---|
|0|1|1|1|1|1|1|1|1|
|1|1|1|1|1|1|1|1|1|
|2|0|0|0|0|0|0|0|0|
|3|0|0|0|0|0|0|0|0|
|4|0|0|0|0|0|0|0|0|
|5|0|0|0|0|0|0|0|0|
|6|1|1|1|1|1|1|1|1|
|7|1|1|1|1|1|1|1|1| b(i+3) encode

|Row\Col|0|1|2|3|4|5|6|7|
|---|---|---|---|---|---|---|---|---|
|0|1|1|1|1|1|1|1|1|
|1|0|0|0|0|0|0|0|0|
|2|0|0|0|0|0|0|0|0|
|3|1|1|1|1|1|1|1|1|
|4|1|1|1|1|1|1|1|1|
|5|0|0|0|0|0|0|0|0|
|6|0|0|0|0|0|0|0|0|
|7|1|1|1|1|1|1|1|1| b(i+5) encode

WIRELESS ELECTRONIC DEVICE WITH A DECODER AND ASSOCIATED METHODS

TECHNICAL FIELD

The present disclosure relates to the field of wireless communications, and more particularly, to a method and device for comparing metrics used in a maximum likelihood decoding process.

BACKGROUND

In a digital communications system, each symbol constituting a message goes through a modulation process before being transmitted. Modulation converts a digital signal into a form which can be transmitted in a channel. The modulation is performed by loading the digital signal onto one or more carriers. This provides a certain variation to the carrier according to a digital value of the digital signal, and enables a receiver to restore the original digital signal from the modulated signal based on the information of the modulation scheme.

Examples of digital modulation schemes include binary phase shift keying (BPSK), quadrature PSK (QPSK) and quadrature amplitude modulation (QAM). BPSK gives variation to a phase of a carrier by utilizing a binary symbol represented as a 0 or a 1. QPSK transmits four levels of data by altering a phase of the carrier into 4 different values having a 90 degree interval. QAM is based on changing both an amplitude and a phase. For example, QAM may produce signals of which amplitudes are identical but phases are different, signals of which phases are identical but amplitudes are different, and signals of which both phases and amplitudes are different. Representative examples of QAM are 16QAM, 64QAM and 256QAM, and may represent 16, 64 and 256 different data values, respectively.

With respect to the above described modulation schemes, a receiver restores an original message through processes of demodulation and detection. The demodulation is a restoration of a signal, while the detection is a process of detecting a digital value of the signal. In the case of BPSK, detection of a message is relatively easy, for it only requires a decision between two possible values.

However, in the case of QPSK or QAM, the decision process is more complex due to the increased number of possible transmit values. Common detection techniques, rather than making an instantaneous decision as to whether a bit is a 0 or a 1, generate a value representing the likelihood of a 0 or a 1. This determination is called a soft decision. In this instance, a detector output is called a soft bit. More particularly, the soft decision is performed by calculating a likelihood metric for each bit. The likelihood metric is a value indicating a likelihood that a particular signal may have been transmitted with respect to a received signal.

A QAM64 constellation map 10 is provided in FIG. 1, where each complex constellation point on the transmit side is encoded on 6 bits, i.e., a hextuplet. For example, complex constellation point 12 encoded using bits 101111. Part of the maximum likelihood decoding process requires the generation of minimum metric values for all points of the transmitted constellation point as well as the selection of the "best" metric. For higher order QAM modulation schemes a large number of comparison operations have to be performed on each transmitted symbol to find the best metric.

Each complex constellation point on the constellation map is represented by a symbol, where each symbol is defined by 6 bits {b(i),b(i+1),b(i+2) ... b(i+5)}. One common decoding technique requires the selection (and combination) of two metrics for each encoded data bit in the symbol. One metric is selected from the set where the encoded bit is a 1, and the other metric is selected from the set where the bit is a 0. The selection process is performed for each bit. Diagrams 20-25 show the corresponding encoding of each bit individually is provided in FIGS. 2a-2f.

For example, in order to decode bit b(i), which corresponds to diagram 20 in FIG. 2a, the best likelihood metric is selected from the 32 values in columns 0 ... 3 representing the probability (i.e., likelihood) that b(i) was transmitted as a 1, and the best likelihood metric is also selected from columns 4 ... 7 representing the probability (i.e., likelihood) that b(i) was transmitted as a 0. As far as bit b(i) is concerned, a tree comparison may be performed on each group of 32 metrics in any order requiring 16+8+4+2+1=31 comparison operations to determine the best likelihood metric.

To determine the best likelihood metric for each bit being a 1 and being a 0, 62 comparison operations are performed per bit. Since there are 6 bits per symbol, the total number of comparison operations is 6×62=372 for each symbol, i.e., hextuplet. This comparison process is computational intensive, which negatively effects processing times as well as power consumption.

BRIEF DESCRIPTION OF THE DRAWINGS

FIGS. 2a-2f are diagrams separating the encoding scheme of FIG. 1 into individual bits.

DETAILED DESCRIPTION

Figure 1:
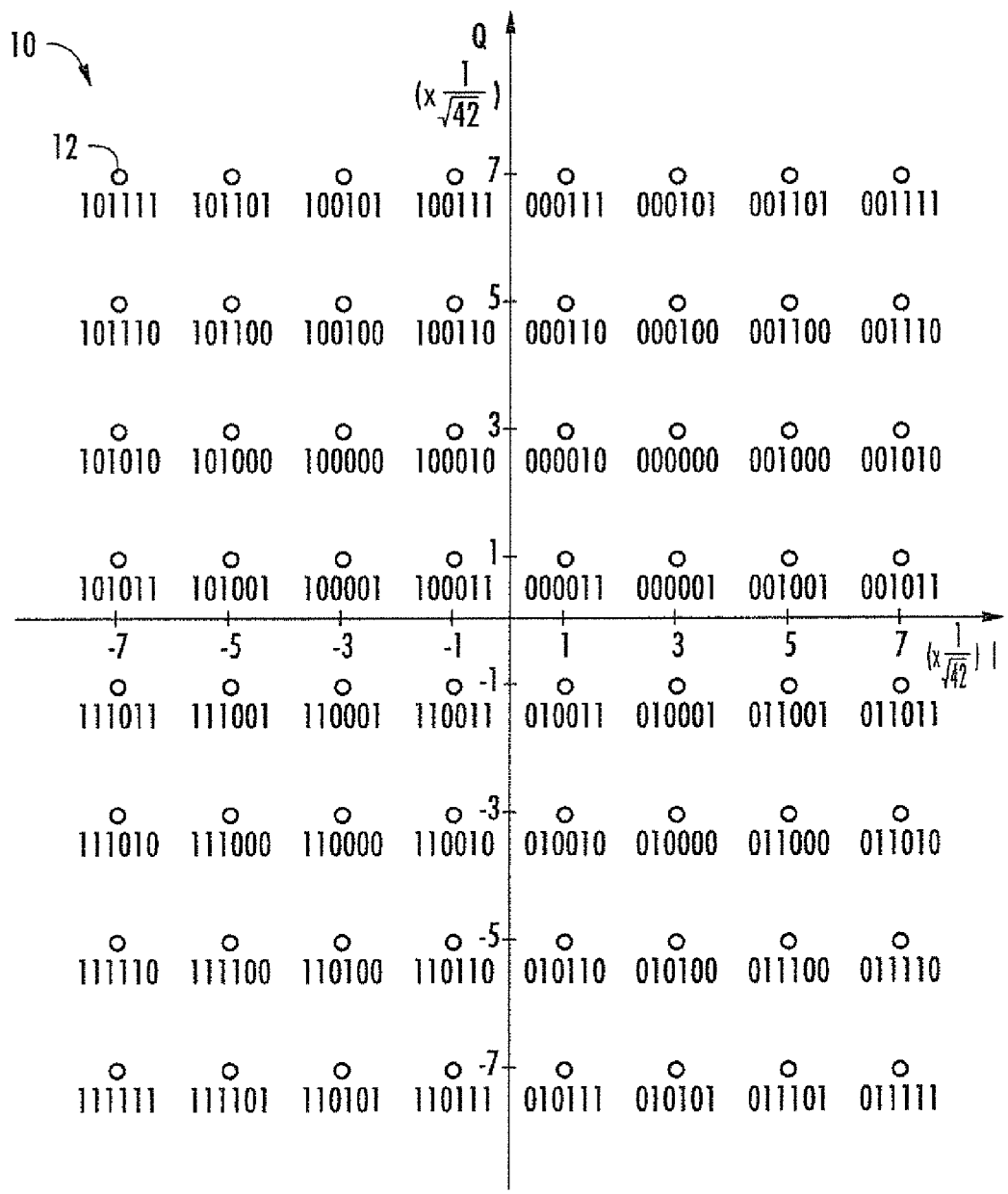
FIG. 1 is a 64QAM constellation map in accordance with the prior art, where each point on the constellation map corresponds to an encoded symbol to be transmitted.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

In accordance with one exemplary aspect, a method for operating a decoder includes receiving a complex signal representative of a received symbol from among a plurality of symbols, with the received symbol comprising a plurality of bits and corresponding to a respective point on a constellation map. A plurality of likelihood metrics may be generated for the received symbol, with each likelihood metric reflecting a likelihood of the received symbol corresponding to one of the points on the constellation map. The plurality of likelihood metrics may be arranged in columns and rows.

The method may further comprise determining common likelihood metrics for each column and for each row. A determination may be made as to which bits in the received symbol are to be compared by columns for selecting best likelihood metrics, and which bits in the received symbol are to be compared by rows for selecting best likelihood metrics.

The common likelihood metrics may be compared to determine a best likelihood metric for the bits in the received symbol that are to be compared by columns, and to determine a best likelihood metric for the bits in the received symbol that are to be compared by rows. The common likelihood metrics advantageously reduce the number of comparisons performed by the decoder when determining the best likelihood metrics for the bits within the received symbol. Since the comparison process is computational intensive, sharing common results prevents the decoder from having to repeat the same comparisons associated with the different bits making up the received symbol. For a battery powered receiver, this helps to prolong the life of the battery.

Determining which bits in the received symbol are to be compared by columns and by rows may be based on half of the bits being compared by columns and with the other half of the bits being compared by rows. The columns and rows of the bits may match up with the columns and rows of the plurality of likelihood metrics.

For each bit being compared by columns, half of the columns may correspond to the bit being a 1 and where the other half of the columns may correspond to the bit being a 0. Similarly, for each bit being compared by rows, half of the rows may correspond to the bit being a 1 and where the other half of the rows may correspond to the bit being a 0.

Comparing the common likelihood metrics comprises for each bit to be compared by columns may comprise comparing the common likelihood metrics for the columns corresponding to the bit being a 1 to determine a best likelihood metric, and comparing the common likelihood metrics for the columns corresponding to the bit being a 0 to determine a best likelihood metric.

Comparing the common likelihood metrics comprises for each bit to be compared by rows may comprise comparing the common likelihood metrics for the rows corresponding to the bit being a 1 to determine a best likelihood metric, and comparing the common likelihood metrics for the rows corresponding to the bit being a 0 to determine a best likelihood metric.

In accordance with another exemplary aspect, a receiver comprises a decoder configured to perform the above described steps.

Figure 3:
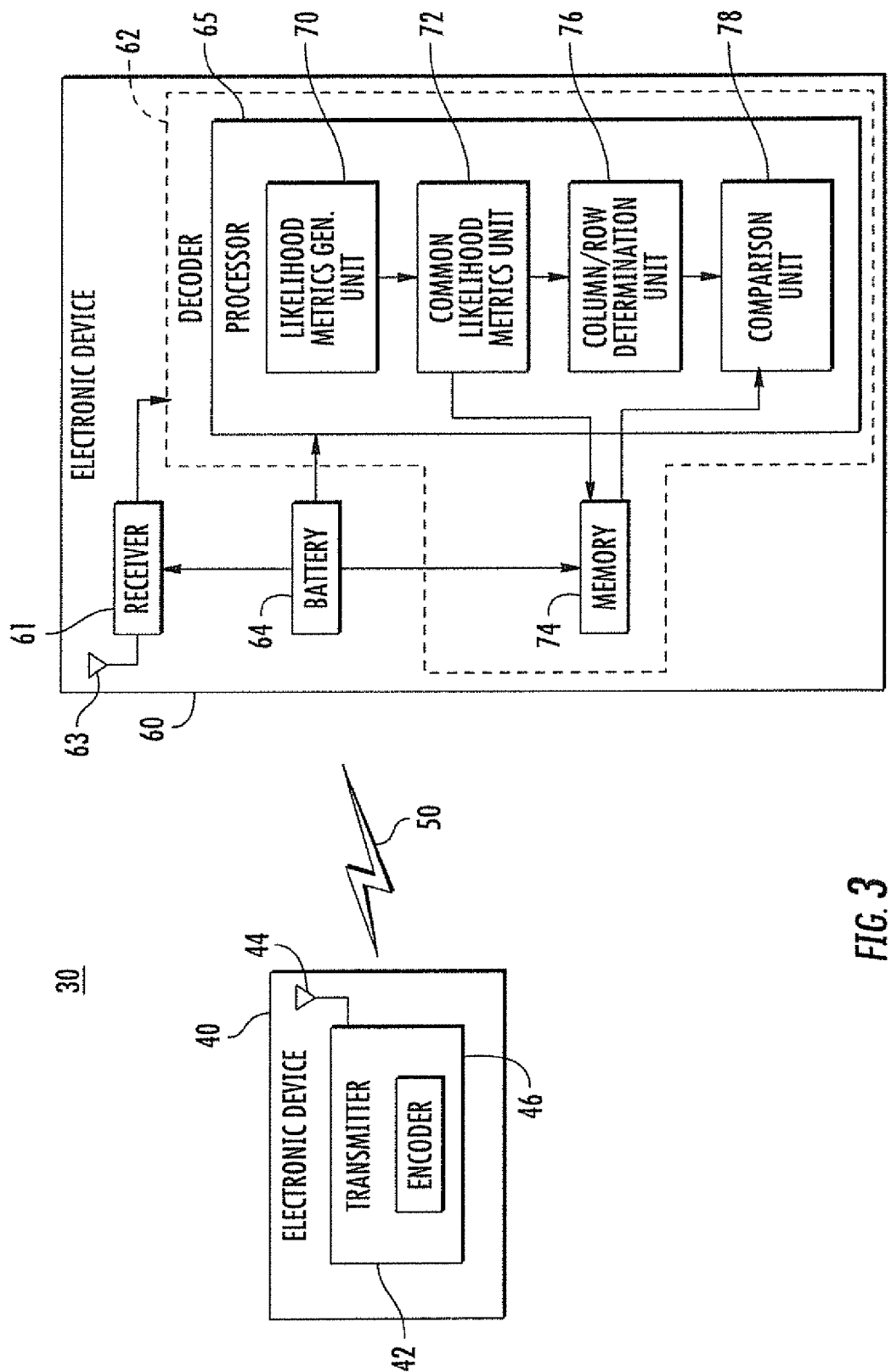
FIG. 3 is a block diagram of a wireless communications system in accordance with one exemplary aspect.

Referring now to FIG. 3, a wireless communications system 30 includes a first electronic device 40 communicating with a second electronic device 60. The first electronic device 40 includes a transmitter 42 coupled to an antenna 44. The transmitter 40 includes an encoder 46 configured to encode a complex signal based on a symbol from a plurality of symbols, with each symbol comprising a plurality of bits and corresponding to a respective point on the signal constellation map 10 as illustrated in FIG. 1.

For discussion purposes, the encoding is based on a 64QAM. Other encoding schemes may be used, such as BPSK and QPSK, and other example QAMs include 16QAM and 256QAM, as readily appreciated by those skilled in the art.

The encoded complex signal is transmitted over a communications channel 50 to the second electronic device 60. The received encoded complex signal is typically corrupted by noise within the communications channel 50. The second electronic device 60 includes a receiver 61 coupled to an antenna 63. A decoder 62 is coupled the receiver 61 for decoding the received complex signal, and includes a processor 65 and a memory 74 coupled thereto. A battery 64 is coupled to the decoder 62 and to the receiver 61.

Figure 4:
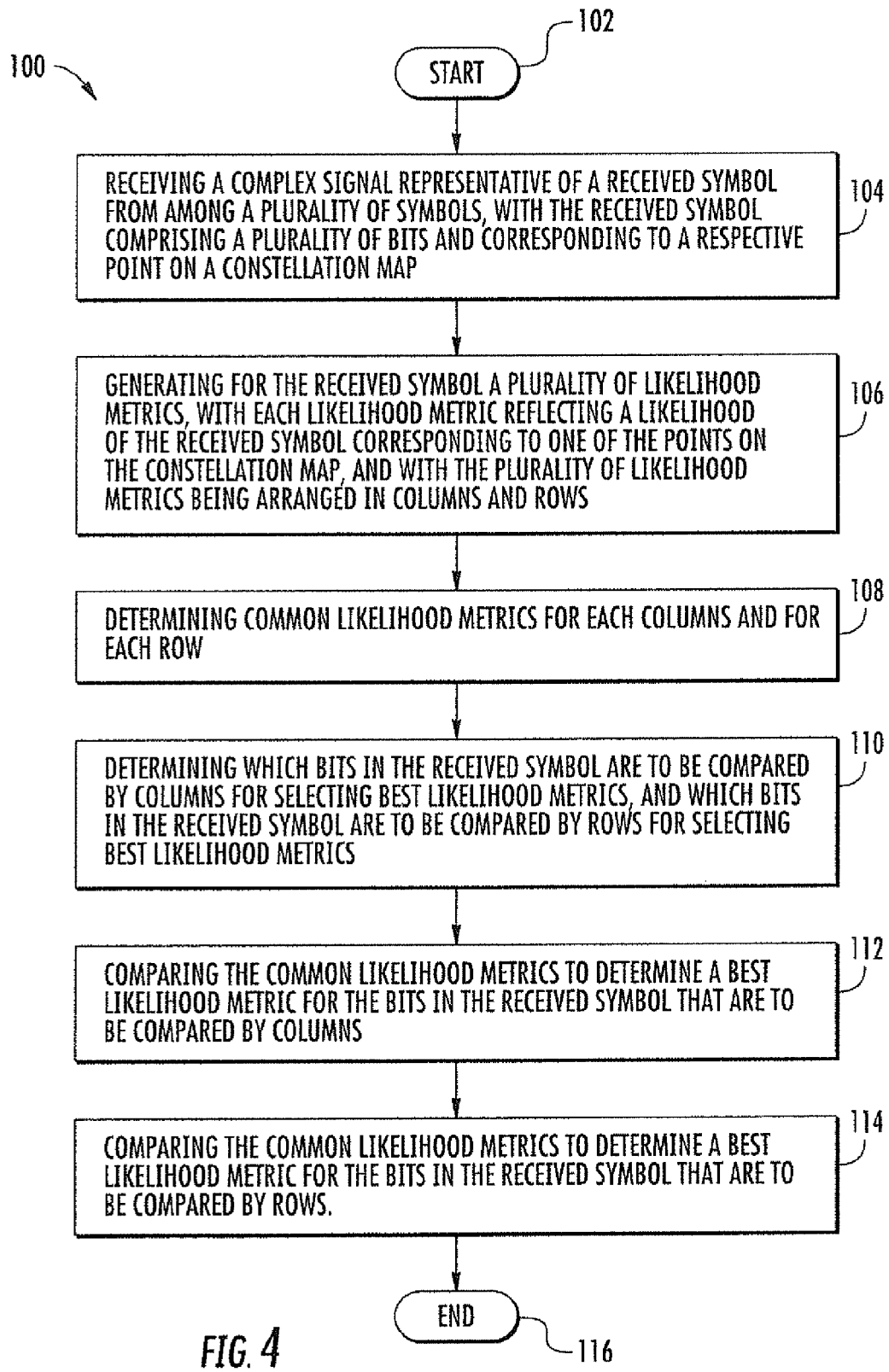
FIG. 4 is a flowchart illustrating a method for operating the decoder illustrated in FIG. 3.

When discussing the decoder 62, reference will also be made to the flowchart 100 in FIG. 4 illustrating a method for operating the decoder. From the start (Block 102), the decoder 62 receives from the transmitter 40 at Block 104 a complex signal representative of a received symbol from among a plurality of symbols, with the received symbol comprising a plurality of bits and corresponding to a respective point on a constellation map.

The processor 65 within the decoder 62 includes a likelihood metrics generation unit 70 for generating likelihood metrics at Block 106 for each received symbol, with each likelihood metric reflecting a likelihood of the received symbol corresponding to one of the points on the constellation map 10. The likelihood metrics are arranged in columns and rows.

The processor 65 further includes a common likelihood metrics unit 72, a column/row determination unit 76, and a comparison unit 78. The common likelihood metrics unit 72 is configured to determine at Block 108 common likelihood metrics for each column and for each row. A column/row determination unit 76 is configured to determine at Block 110 which bits in the received symbol are to be compared by columns for selecting best likelihood metrics, and which bits in the received symbol are to be compared by rows for selecting best likelihood metrics.

A comparison unit 78 is configured to compare the common likelihood metrics to determine a best likelihood metric for the bits in the received symbol that are to be compared by columns at Block 112, and compare the common likelihood metrics to determine a best likelihood metric for the bits in the received symbol that are to be compared by rows at Block 114. The method ends at Block 116.

The decoder 62 is advantageously configured to reduce the number of comparison operations by finding commonality in the decoding process. By taking advantage of this commonality, processing times may be improved and power consumption may be reduced.

As discussed in the background, in the case of QAM, it is not easy to detect messages because a large number of data symbols are densely allocated in a limited frequency band. It is not clearly determined whether received data corresponds to a 0 or a 1. Instead, a likelihood that an originally transmitted bit value of a received signal is a 0 or a 1 is determined.

This determination is referred to as a soft decision, as readily understood by those skilled in the art. After a number of soft decisions have been collected by the decoder 62 for a plurality of symbols, then hard decisions can be made for the plurality of symbols. Discussion of the present decoder 62 is limited to how the soft decisions are made, and more particularly, to how a best likelihood metric for each bit being a 1 and how a best likelihood metric for each bit being a 0 are selected for each symbol.

Operation of the decoder 62 will now be discussed in greater detail. As noted above, the decoder 62 includes a likelihood metrics generation unit 70 for generating likelihood metrics for each received symbol. Generation of the likelihood metrics, for example, may be characterized by calculating a complex distance between each symbol and a received signal in the signal constellation map 100 of FIG. 1. The likelihood metrics are regenerated for each received symbol, and are arranged in columns and rows. The likelihood metrics are the same for each bit within the received symbol.

Since the likelihood metrics are the same for each bit within the received symbol, the common likelihood metrics unit 72 determines common likelihood metrics for each column and for each row. For each column, 7 comparisons are made to determine a common likelihood metric. Similarly, for each row, 7 comparisons are made to determine a common likelihood metric. Since there are 8 columns in the illustrated example, 56 column comparisons are made and 56 row comparisons are made. Once the common likelihood metrics have been determined for each column and for each row, these computation steps do not have to be repeated. The common likelihood metrics may be stored in a memory 74 or within the processor 65 so that the comparison results may be retrieved when needed.

The column/row determination unit 76 determines which bits in the received symbol are to be compared by columns for selecting best likelihood metrics, and which bits in the received symbol are to be compared by rows for selecting best likelihood metrics. For the 6 bits that make up each received symbol, bits b(i), b(i+2) and b(i+4) are compared by columns, and bits b(i+1), b(i+3) and b(i+5) are compared by rows, as illustrated in FIGS. 2a-2f.

In particular, bit b(i) corresponds to diagram 20 in FIG. 2a, bit b(i+1) corresponds to diagram 21 in FIG. 2b, bit b(i+2) corresponds to diagram 22 in FIG. 2c, bit b(i+3) corresponds to diagram 23 in FIG. 2d, bit b(i+4) corresponds to diagram 24 in FIG. 2e, and bit b(i+5) corresponds to diagram 25 in FIG. 2f.

For bits b(i), b(i+2) and b(i+4) being compared by columns, half of the columns correspond to the bit being a 1 and with the other half of the columns correspond to the bit being a 0. In bit b(i), for example, columns 0-3 correspond to the bit being a 1 and columns 4-7 correspond to the bit being 0.

For bits b(i+1), b(i+3) and b(i+5) being compared by rows, half of the rows correspond to the bit being a 1 and with the other half of the rows correspond to the bit being a 0. In bit b(i+1), for example, rows 0-3 correspond to the bit being a 0 and columns 4-7 correspond to the bit being 1.

To determine the best likelihood metric for bit b(i) being a 1, the comparison unit 78 retrieves the common likelihood metrics for columns 0-3. Three computation comparisons are made to determine the best likelihood metric being a 1 for bit b(i). Similarly, to determine the best likelihood metric for bit b(i) being a 0, the comparison unit 78 retrieves the common likelihood metrics for columns 4-7. Three computation comparisons are made to determine the best likelihood metric being a 0 for bit b(i). This process is repeated for bit b(i+2) and bit b(i+4). So far, 74 (56+18) computations comparisons have been made with respect to the column comparisons.

To determine the best likelihood metric for bit b(i+1) being a 0, the comparison unit 78 retrieves the common likelihood metrics for rows 0-3. Three computation comparisons are made to determine the best likelihood metric being a 0 for bit b(i+1). Similarly, to determine the best likelihood metric for bit b(i+1) being a 1, the comparison unit 78 retrieves the common likelihood metrics for rows 4-7. Three computation comparisons are made to determine the best likelihood metric being a 1 for bit b(i). This process is repeated for bit b(i+2) and bit b(i+4). So far, 74 (56+18) computations comparisons have been made with respect to the row comparisons.

Based on the above intermediate determinations by the common likelihood metrics unit 76, computational savings can be made by structuring a comparator tree such that the comparison unit 78 makes use of the common likelihood metrics. Without taking advantage of the common likelihood metrics, the comparison unit 78 would recalculate the likelihood metrics for each column and for each row for each of the 6 bits. This results in 372 (6×62) computational comparisons to be made for each symbol. In contrast, 148 computational comparisons are made when taking into account the savings that can be gained when calculating in advance the common likelihood metrics.

Figure 5:
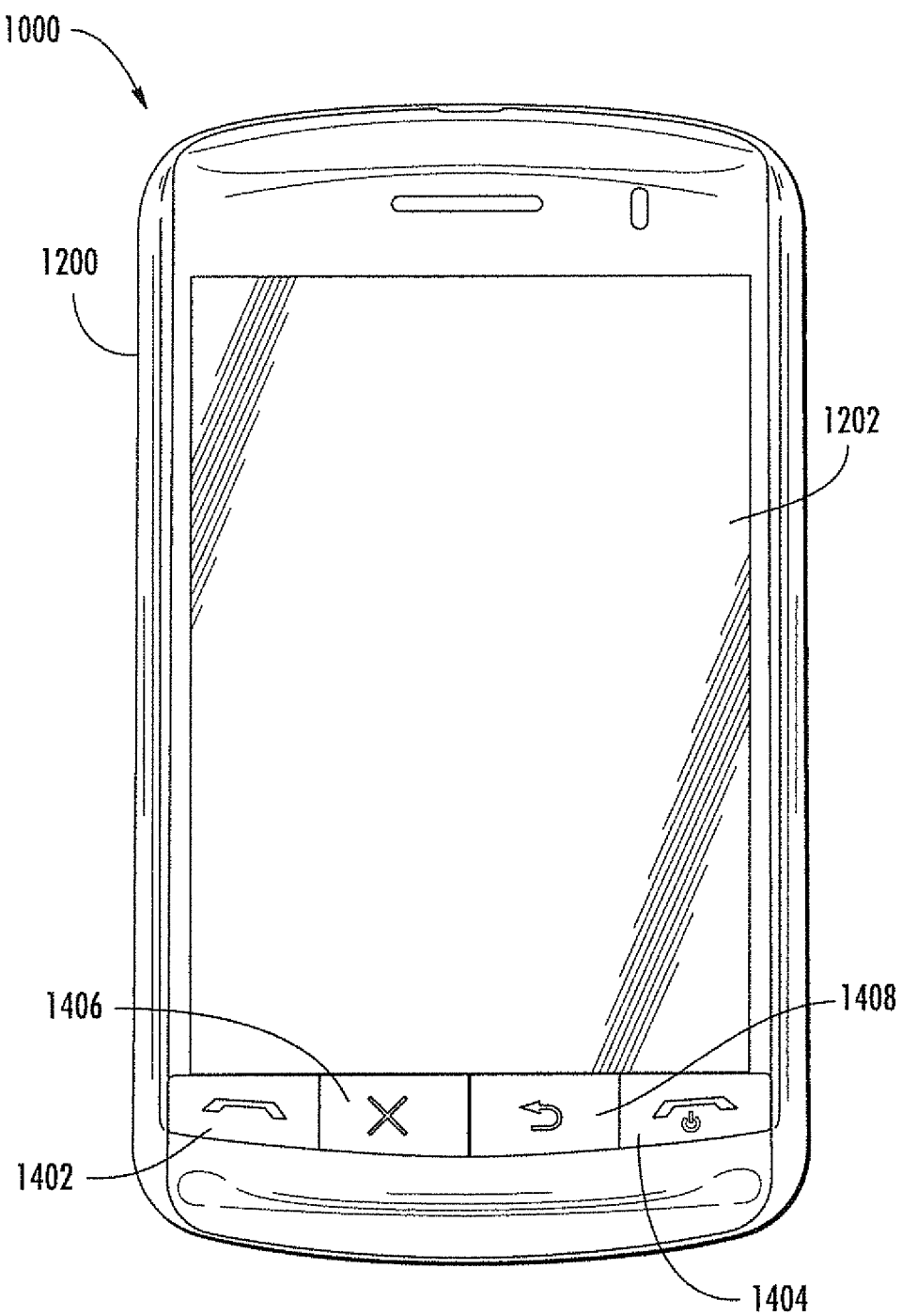
FIG. 5 is a front view of a mobile wireless communications device in accordance with another exemplary aspect.

Exemplary components that may be used in various embodiments of the above-described mobile wireless communications device are now described with reference to an exemplary mobile wireless communications device 1000 shown in FIGS. 5 and 6.

The mobile wireless communications device 1000 illustratively includes a portable housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. The keypad 1400 includes a plurality of control keys including an "off hook" (i.e., initiate phone call) key 1402, an "on hook" (i.e., discontinue phone call) key 1404, a menu key 1406, and a return or escape key 1408.

A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 6:
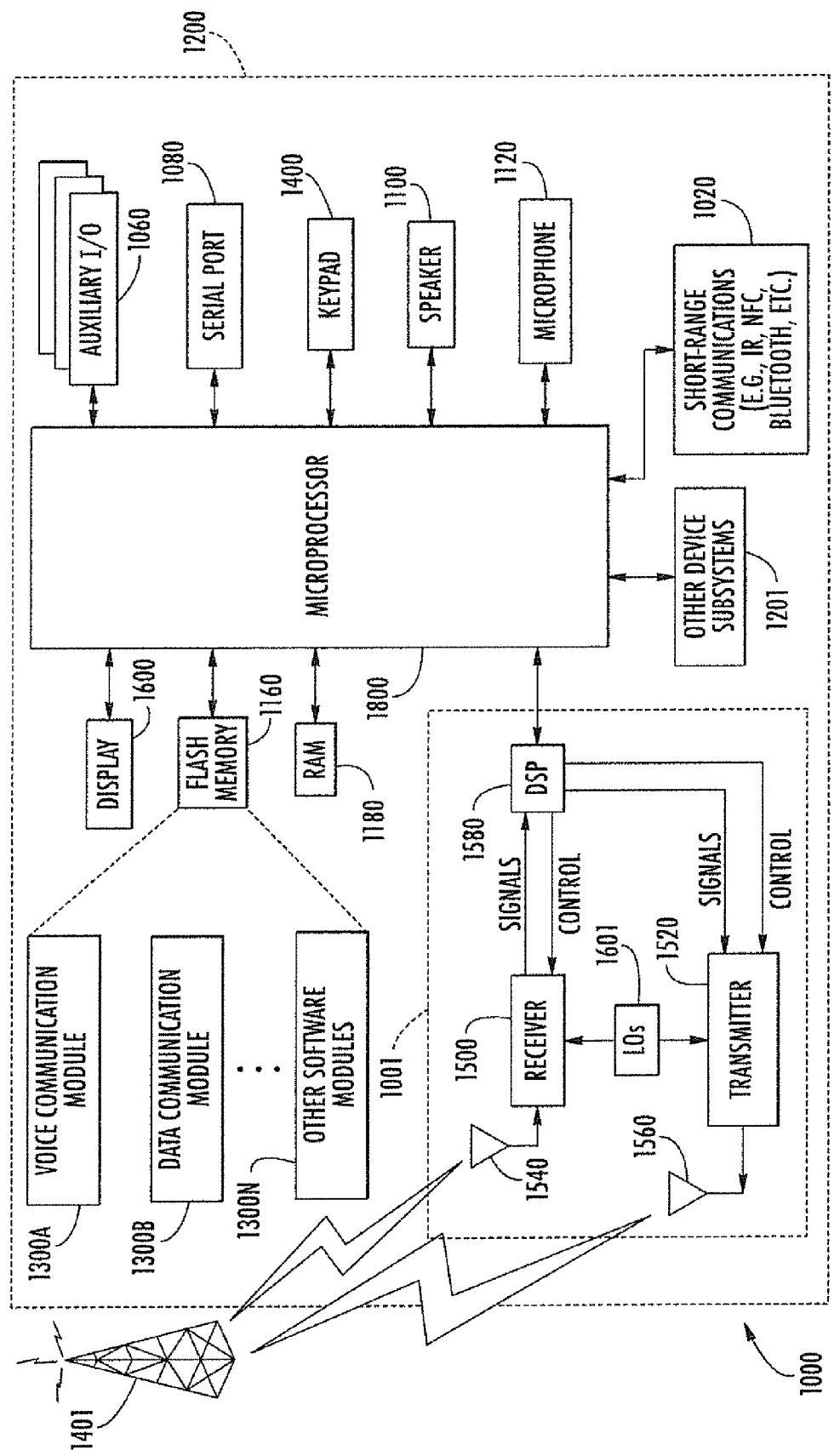
FIG. 6 is a schematic block diagram illustrating additional components that may be included in the mobile wireless communications device illustrated in FIG. 5.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or units 1300A-1300N on the device 1000, such as software units for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem

1001 includes a receiver 1500, a transmitter 1520, and one or more antennas 1540 and 1560. In addition, the communications subsystem 1001 also includes a processing unit, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity unit, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications unit to provide for communication with similarly-enabled systems and devices.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included as readily appreciated by those skilled in the art.

That which is claimed is:

1. A method for operating a decoder comprising:
receiving a complex signal representative of a received symbol from among a plurality of symbols, with the received symbol comprising a plurality of bits and corresponding to a respective point on a constellation map;
generating for the received symbol a plurality of likelihood metrics, with each likelihood metric reflecting a likelihood of the received symbol corresponding to one of the points on the constellation map, and with the plurality of likelihood metrics being arranged in columns and rows;
determining common likelihood metrics for each column and for each row;
determining which bits in the received symbol are to be compared by columns for selecting best likelihood metrics, and which bits in the received symbol are to be compared by rows for selecting best likelihood metrics;
comparing the common likelihood metrics to determine a best likelihood metric for the bits in the received symbol that are to be compared by columns; and
comparing the common likelihood metrics to determine a best likelihood metric for the bits in the received symbol that are to be compared by rows.

2. The method according to claim 1 wherein determining which bits in the received symbol are to be compared by columns and by rows is based on half of the bits being compared by columns and with the other half of the bits being compared by rows, with the columns and rows matching up with the columns and rows of the plurality of likelihood metrics.

3. The method according to claim 2 wherein for each bit being compared by columns, half of the columns correspond to the bit being a 1 and with the other half of the columns corresponding to the bit being a 0; and wherein for each bit being compared by rows, half of the rows correspond to the bit being a 1 and with the other half of the rows corresponding to the bit being a 0.

4. The method according to claim 3 wherein comparing the common likelihood metrics comprises for each bit to be compared by columns comprises:
comparing the common likelihood metrics for the columns corresponding to the bit being a 1 to determine a best likelihood metric; and comparing the common likelihood metrics for the columns corresponding to the bit being a 0 to determine a best likelihood metric.

5. The method according to claim 3 wherein comparing the common likelihood metrics comprises for each bit to be compared by rows comprises:
  comparing the common likelihood metrics for the rows corresponding to the bit being a 1 to determine a best likelihood metric; and
  comparing the common likelihood metrics for the rows corresponding to the bit being a 0 to determine a best likelihood metric.

6. The method according to claim 1 further comprising storing the common likelihood metrics.

7. The method according to claim 1 wherein the decoder is configured as a maximum likelihood decoder.

8. The method according to claim 1 wherein generating the plurality of likelihood metrics for the received symbol comprises calculating a complex distance between the received signal and each symbol in the constellation map.

9. A method for operating a decoder comprising:
  receiving a signal representative of a received symbol from among a plurality of symbols, with the received symbol comprising a plurality of bits and corresponding to a respective point on a constellation map;
  generating for the received symbol a plurality of likelihood metrics, with each likelihood metric reflecting a likelihood of the received symbol corresponding to one of the points on the constellation map, and with the plurality of likelihood metrics being arranged in columns and rows;
  determining common likelihood metrics for each column and for each row;
  determining which bits in the received symbol are to be compared by columns for selecting best likelihood metrics, and which bits in the received symbol are to be compared by rows for selecting best likelihood metrics, with the determining comprising
    for each bit being compared by columns, half of the columns correspond to the bit being a 1 and with the other half of the columns corresponding to the bit being a 0, and
    for each bit being compared by rows, half of the rows correspond to the bit being a 1 and with the other half of the rows corresponding to the bit being a 0;
  comparing the common likelihood metrics to determine a best likelihood metric for the bits corresponding to a 1 and corresponding to a 0 in the received symbol that are to be compared by columns; and
  comparing the common likelihood metrics to determine a best likelihood metric for the bits corresponding to a 1 and corresponding to a 0 in the received symbol that are to be compared by rows.

10. The method according to claim 9 further comprising storing the common likelihood metrics.

11. The method according to claim 9 wherein the decoder is configured as a maximum likelihood decoder.

12. The method according to claim 9 wherein generating the plurality of likelihood metrics for the received symbol comprises calculating a complex distance between the received signal and each symbol in the constellation map.

13. An electronic device comprising:
  a decoder configured to receive a complex signal representative of a received symbol from among a plurality of symbols, with the received symbol comprising a plurality of bits and corresponding to a respective point on a constellation map,
  said decoder comprising
    a likelihood metrics generation unit configured to generate for the received symbol a plurality of likelihood metrics, with each likelihood metric reflecting a likelihood of the received symbol corresponding to one of the points on the constellation map, and with the plurality of likelihood metrics being arranged in columns and rows,
    a common likelihood metrics unit configured to determine common likelihood metrics for each column and for each row, and
    a column/row determination unit configured to determine which bits in the received symbol are to be compared by columns for selecting best likelihood metrics, and which bits in the received symbol are to be compared by rows for selecting best likelihood metrics,
    a comparison unit configured to
      compare the common likelihood metrics to determine a best likelihood metric for the bits in the received symbol that are to be compared by columns, and
      compare the common likelihood metrics to determine a best likelihood metric for the bits in the received symbol that are to be compared by rows.

14. The electronic device according to claim 13 wherein said column/row determination unit is configured to determine which bits in the received symbol are to be compared by columns and by rows is based on half of the bits being compared by columns and with the other half of the bits being compared by rows, with the columns and rows matching up with the columns and rows of the plurality of likelihood metrics.

15. The electronic device according to claim 14 wherein for each bit being compared by columns, half of the columns correspond to the bit being a 1 and with the other half of the columns corresponding to the bit being a 0; and wherein for each bit being compared by rows, half of the rows correspond to the bit being a 1 and with the other half of the rows corresponding to the bit being a 0.

16. The electronic device according to claim 15 wherein said comparison unit is configured to perform the following:
  compare the common likelihood metrics for the columns corresponding to the bit being a 1 to determine a best likelihood metric; and
  compare the common likelihood metrics for the columns corresponding to the bit being a 0 to determine a best likelihood metric.

17. The electronic device according to claim 15 wherein said comparison unit is configured to perform the following:
  compare the common likelihood metrics for the rows corresponding to the bit being a 1 to determine a best likelihood metric; and
  compare the common likelihood metrics for the rows corresponding to the bit being a 0 to determine a best likelihood metric.

18. The electronic device according to claim 13 wherein said decoder is configured as a maximum likelihood decoder.

19. The electronic device according to claim 13 wherein said decoder comprises a processor and a memory coupled thereto.

20. The electronic device according to claim 13 wherein said common likelihood metrics unit is configured to calculate a complex distance between the received signal and each symbol in the constellation map to generate the plurality of likelihood metrics for the received symbol.

* * * * *